: US 10,939,013 B2

United States Patent
Guidotti et al.

(10) Patent No.: US 10,939,013 B2
(45) Date of Patent: Mar. 2, 2021

(54) ENCODING INFORMATION WITHIN FEATURES ASSOCIATED WITH A DOCUMENT

(71) Applicant: International Business Machines Corporation, Armonk, NY (US)

(72) Inventors: Alice Guidotti, Rome (IT); Marco Imperia, Rome (IT); Daniele Morgantini, Rome (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 16/124,993

(22) Filed: Sep. 7, 2018

(65) Prior Publication Data

US 2020/0084335 A1  Mar. 12, 2020

(51) Int. Cl.
*G06K 9/00* (2006.01)
*H04N 1/32* (2006.01)
*G06T 1/00* (2006.01)

(52) U.S. Cl.
CPC ....... *H04N 1/32229* (2013.01); *G06T 1/0028* (2013.01)

(58) Field of Classification Search
None
See application file for complete search history.

(56) References Cited

U.S. PATENT DOCUMENTS

| | | | |
|---|---|---|---|
| 7,305,104 B2 | 12/2007 | Carr et al. | |
| 7,806,322 B2 | 10/2010 | Brundage et al. | |
| 8,176,054 B2 * | 5/2012 | Moraleda | G06K 9/4685 707/743 |
| 8,543,823 B2 | 9/2013 | Carr et al. | |
| 9,111,341 B2 | 8/2015 | Wang et al. | |
| 2003/0149936 A1 * | 8/2003 | Tamaru | G06T 1/005 715/210 |

(Continued)

OTHER PUBLICATIONS

Yang et al., "Text document authentication by integrating inter character and word spaces watermarking", IEEE Xplore, IEE.com, Jun. 27-30, 2004, ICME '04, 2004 IEEE International Conference on Multimedia and Expo, 3 pps., http://ieeexplore.ieee.org/document/1394360/.

(Continued)

*Primary Examiner* — Hadi Akhavannik
(74) *Attorney, Agent, or Firm* — Daniel R. Simek

(57) ABSTRACT

A method for encoding information within a feature of a document. The method includes at least one computer processors determining information to encode within a document. The method further includes identifying a feature within the document to encode information within based, at least in part, on metadata of the document corresponding to the feature. The method further includes determining a set of geometric properties of one or more segments of the identified feature. The method further includes encoding, by one or more computer processors, a first bit of information of the determined information within a first segment of the feature within the document by modifying one or more geometric properties respectively associated with the first segment. The method further includes outputting the document with information encoded within the first segment.

20 Claims, 6 Drawing Sheets

(56) References Cited

U.S. PATENT DOCUMENTS

| | | | |
|---|---|---|---|
| 2008/0093468 A1* | 4/2008 | Fan | B42D 15/0073 |
| | | | 235/494 |
| 2008/0162931 A1* | 7/2008 | Lord | H04L 9/0822 |
| | | | 713/165 |
| 2015/0228045 A1 | 8/2015 | Mehta et al. | |
| 2016/0035060 A1 | 2/2016 | Lahmi et al. | |
| 2017/0329943 A1* | 11/2017 | Choi | G06F 21/602 |

OTHER PUBLICATIONS

Alattar et al., "Watermarking Electronic Text Documents Containing Justified Paragraphs and Irregular Line Spacing", SPIE proceedings series. Society of Photo-Optical Instrumentation Engineers, 2004, 11 pps., http://citeseerx.ist.psu.edu/viewdoc/download?doi=10.1.1.85.5898&rep=rep1&type=pdf.

* cited by examiner

ENCODING INFORMATION WITHIN FEATURES ASSOCIATED WITH A DOCUMENT

BACKGROUND OF THE INVENTION

The present invention relates generally to the field of document security, and more particularly to embedding a watermark containing encoded information within visible features of a document.

Steganography is the art of embedding a concealed message inside of content, such as within text or a picture. Document watermarking is an application of steganography so to make apparently identical documents distinguishable under proper analysis. One use of document watermarking is to track the flow of a reserved document that is leaked out of the intended circulation context by having different watermarking embedded into each copy of the document, allowing source of the leak to be identified. Another typical usage for watermarking is detection of counterfeiting where someone attempting to produce an apparently genuine document is not aware that a watermark is expected to be present as an attestation of genuineness.

SUMMARY

According to embodiments of the present invention, there is a method, computer program product, and/or system for encoding information within a feature of a document. The method includes at least one computer processors determining information to encode within a document. The method further includes identifying a feature within the document to encode information within based, at least in part, on metadata of the document corresponding to the feature. The method further includes determining a set of geometric properties of one or more segments of the identified feature. The method further includes encoding, by one or more computer processors, a first bit of information of the determined information within a first segment of the feature within the document by modifying one or more geometric properties respectively associated with the first segment. The method further includes outputting the document with information encoded within the first segment

DETAILED DESCRIPTION

Figure 1:
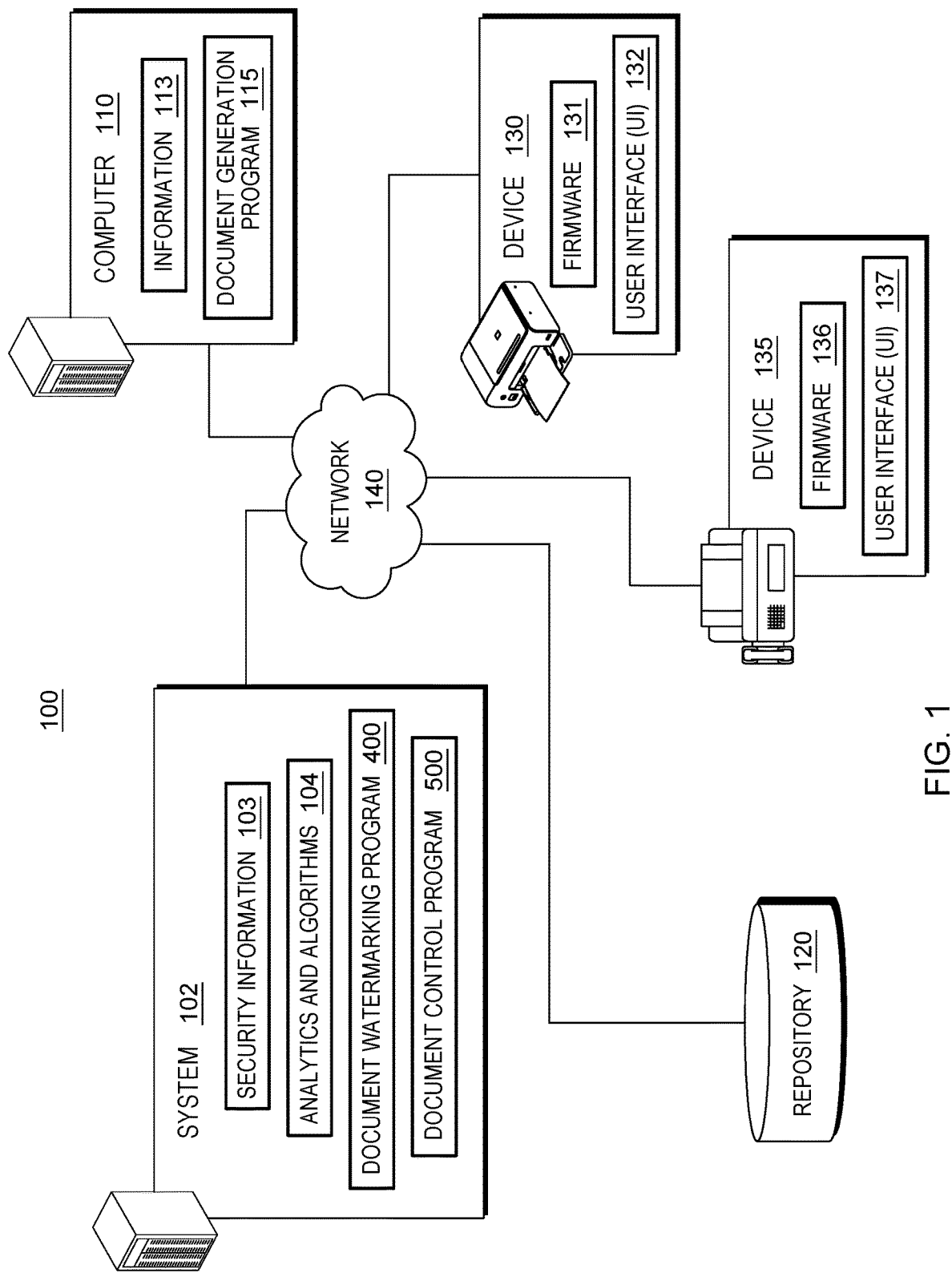
FIG. 1 illustrates a networked computing environment, in accordance with an embodiment of the present invention.

Embodiments of the present invention recognize that a fundamental benefit of a watermark is to disguise the presence of the watermark within a document. In addition, it is preferable that a comparison of two differently watermarked copies of the document does not reveal that the documents are not actually identical. For documents in graphical form (e.g. printed on paper) various techniques are known. In one example, the technique consists of modifying of the position and shape of textual characters or varying the white-space between words. In another example, a different technique is implemented on color computer printers that consists of adding tiny yellow dots to each page. The barely-visible dots contain encoded serial numbers/ID of a printer, IDs of pages, and date and time stamps related to when a document was printed or copied.

Embodiments of the present invention recognize that watermarking techniques that rely on fixed attributes, such a size and/or color may fail in response to a document being output at a different resolution, printed utilizing a different font, printed as black & white or grayscale as opposed to color, and/or printed at a different magnification. Further, reproducing the document utilizing a copier or scanner may not reproduce the watermark in a manner that information associated within the watermark can be extracted. Embodiments of the present invention also recognize that storing a copy of the encoded information associated with the watermark is useful for digital rights management (DRM) and various security purposes, such as identifying users. However, without a mechanism to dynamically detect and/or update information encoded within a watermark, the DRM and security processes are less robust. Further, embodiments of the present invention recognize that within an enterprise (e.g., organization, business, government entity, etc.) digital rights management (E-DRM) to control the printing, scanning, and reproduction of documents (e.g., securing confidential documents) can be more important than public DRM associated with the documents.

Embodiments of the present invention convert one or more periodically-varying features within a document into watermarks that encode information among a plurality of segments for shapes within the one or more periodically-varying features. In one embodiment of the present invention, a periodically-varying feature is based on line types or line styles. A set of segments/shapes and spaces that are replicated based on a fixed period (e.g., interval) that repeats multiple times to span the length of the line are represent the periodically-varying feature. Within a document a periodically-varying feature can be identified by a general feature description (e.g., metadata), such as a 50% dashed line where the dashed line includes segments of approximately equal percentages (i.e., 50%/50%) of dark (e.g., black) features and blank (e.g., white) space between features. Other common examples of line-type based periodically-varying features include general feature descriptions, such as a dash dot line, a long-dash line, a long-dash dot line, a long-dash dot dot line, etc. Based on the line-type the number of segments of a repeated series or period varies, such as two for a dashed line (a dash and a space) or six segments for a long-dash dot dot line (a long-dash, space, a dot, another space, another dot, and another space). Feature definitions may include geometric properties (i.e., metadata), such as a distance value, a start-point location, an end-point location, a number of period repeats, and a period definition that can further include one or more geometric properties for each segment of the set of segments (e.g., a feature length, a feature width, a space length, and a feature color). Various document programs, presentation programs, and design program include a library of periodically-varying features, such as line types, fill patterns, shape outlines, and frames.

Some embodiments of the present invention generate a watermark that includes encoded information by modifying other types of periodically-varying features within a document, such as a fill pattern (e.g., checker-board pattern) within a larger feature, such as a frame. Further embodiments of the present invention convert another feature within the document, such as a compound line (two or more parallel lines in close proximity), to create a periodically-varying feature in response to determining that the document lacks dashed lines or other periodically-varying features to watermark the document. In an example, a compound line is converted to segments where the segments abut. The changeable geometric properties are associated segment thicknesses and corresponding changes to the spacing between parallel segments as opposed to lengths features and gaps between features for a dashed line.

Information is encoded within the watermark by modifying one or more geometric properties (e.g., metadata) respectively associated with a feature, a space, or a combination thereof included within the plurality of segments included within a periodically-varying feature, such as a dashed line. One or more bits of information are encoded within a group of segments or shapes of the periodically-varying feature where at least one segment or shape is utilized as a reference with at least one geometric property unaltered, discussed in further detail with respect to FIG. 2b. Examples of portions of a document that can include one or more dashed lines are: a header demarcation, a footer demarcation, figure frames, and other features known in the art. Embodiments of the present invention can also generate a watermark within a page of a document by modifying other types of dashed lines within the document, such as perspective lines and/or detail lines within a mechanical drawing; or dashed lines utilized within portions of a table of a spreadsheet or a ledger. Embodiments of the present invention can be applied by converting horizontal lines, vertical lines, and/or lines at an angle to watermarks that include encoded information. Embodiments of the present invention encode information within the watermark based on one or more security rules, such as one or more E-DRM dictates, or document tracking controls. In addition, embodiments of the present invention can update the stored version of the information associated with a watermark and to dynamically update the encoding within the watermark or within a designated (e.g., reserved) portion of the watermark utilized to include changeable information, such as a printer ID, copy number, an expiration code, or an ID of a user scanning the document being reproduces.

Various embodiments of the present invention include utilizing error-correcting techniques and feature replication methodologies to encode information within the watermark more robustly; and to improve the retrieval of the information encoded within the watermark.

Other embodiments of the present invention are utilized to analyze a document that is scanned to: determine whether a watermark is present, decode information within an identified watermark, and respond to the encoded information associated with the watermark based on information related to scanning the document. In an example, based on various security rules (e.g., dictates) are stored on a network attached system and/or information encoded within the watermark of a document, both physical reproductions (i.e., hardcopies) and digital copies, such files, faxes, and/or e-mails are affected (e.g., controlled) in addition to logging various security items related to the document and the user attempting to output or reproduce the document.

Embodiments of the present invention can be implemented as a server-based application that watermarks documents transmitted to a document repository or retrieved from the document repository (e.g., a shared drive, a network-attached storage system, etc.); as an ancillary program executing within a device of a user; as firmware included within a printer, copier, or scanner; or any combination thereof.

One skilled in the art would recognize that by modifying a document, by including encoded information within a periodically-varying feature of a document that the control, security, and DRM associated with the document is improved. Further, by enabling various aspects of the present invention to operate separately or in combination with various systems, computers, and devices that create, store, output, scan, reproduce, and transmit the document or copies of the document that include the watermark; the security, control, and DRM of documents is further improved. As such, the functioning of such a computing system and/or one or more aspects of a computing environment is seen to be improved in at least these aspects. In addition, by dynamically updating one or more reserved portions of a watermark additional information and controls are associated with the document, thus also improving security. Further, by implementing aspects of the present invention among multiple devices and locations that can share information via a network, or, in some instances, operate independent of network connectivity, the functioning and security of such a computing system and/or one or more aspects of a computing environment is seen to be improved in at least this aspect.

The present invention will now be described in detail with reference to the Figures. FIG. 1 is a functional block diagram illustrating networked computing environment 100, in accordance with embodiments of the present invention. In an embodiment, networked computing environment 100 includes: system 102, computer 110, repository 120, device 130, and device 135, all interconnected over network 140. In some embodiments, networked computing environment 100 includes multiple instances of computer 110, device 130, and device 135. Many modifications to the depicted environment may be made by those skilled in the art without departing from the scope of the invention as recited by the claims.

System 102, computer 110, and repository 120 may be: laptop computers, tablet computers, netbook computers, personal computers (PC), desktop computers, personal digital assistants (PDA), smartphones, wearable devices (e.g., digital eyeglasses, smart glasses, smart watches, personal fitness devices), or any programmable computer systems known in the art. In certain embodiments, system 102, computer 110, and repository 120 represent computer systems utilizing clustered computers and components (e.g., database server computers, application server computers, storage systems, etc.) that act as a single pool of seamless resources when accessed through network 140, as is common in data centers and with cloud-computing applications. In various embodiments, device 130 and device 135 are representative of input/output (I/O) devices related to document processing, such as laser printers, digital photocopiers, inkjet printers, fax machines, digital scanners, and multifunction printers (e.g., all-in-one printers). In general, system 102, computer 110, repository 120, device 130, and device 135 are representative of any programmable electronic device or combination of programmable electronic devices capable of executing machine readable program instructions and communicating via network 140. System 102, computer 110, repository 120, device 130, and device 135 may include components, as depicted and described in further detail with respect to FIG. 6, in accordance with embodiments of the present invention.

In various embodiments, system 102, computer 110, device 130, and device 135 include a user interface (UI) (not shown). A user of system 102, computer 110, device 130, and/or device 135 can interact with a UI via a singular interface device, such as a touch screen (e.g., display) that performs both as an input to a graphical user interface (GUI) and as an output device (e.g., a display) presenting a plurality of icons associated with software applications or images depicting the executing software application. Optionally, an app, such as a web browser, can generate a UI. Alternatively, with respect to device 130 and/or device 135 the UI can be generated by firmware. In some embodiments, system 102 and computer 110 include various input/output (I/O) devices (not shown), such as a digital camera, a speaker, a video display and/or a microphone. A UI may accept input from a plurality of input/output (I/O) devices including, but not limited to, a tactile sensor interface (e.g., a touch screen, a touchpad), a natural user interface (e.g., a voice control unit, a camera, a motion capture device, eye tracking, etc.), a video display, or another peripheral device. An I/O device interfacing with a UI may be connected to an instance of system 102, computer 110, device 130, and device 135, which may operate utilizing a wired connection, such as a universal serial bus port or wireless network communications (e.g., infrared, NFC, etc.). For example, an I/O device may be a peripheral, such as a keyboard, a mouse, a click wheel, or a headset that provides input from a user.

System 102 includes: security information 103, analytics and algorithms 104, document watermarking program 400, document control program 500 and various programs and databases (not shown), such as a feature recognition program, a computer-aided design (CAD) program, an office productivity suite, an e-mail program, etc. In an embodiment, system 102 is the system that controls access to repository 120. In various embodiments, system 102 manages various security functions, DRM controls, and E-DRM controls for networked computing environment 100.

Security information 103 includes information organized within various tables, associative arrays, and databases. In one embodiment, security information 103 includes rules and dictates related to encoding information within a watermark of a document. Examples of rules and dictates include: defining sections and subsections of a watermark and defining the information to be included within a section or subsection, error-correction schemes, information duplication/replication across multiple periodically-varying features utilized for a watermark, determining a security level for a document based on a sematic or a cognitive text analysis, etc. Security information 103 may include various criteria or a hierarchy of priority related to including or excluding information to encode within a periodically-varying feature with a constrained storage capacity (i.e., bit limit). Similarly, security information 103 may include various criteria or hierarchies of priority related distributing encoded information among multiple periodically-varying features that are associated with constrained storage capacities.

In another embodiment, security information 103 includes a database related to documents, such as a plurality of documents stored in repository 120. The database of security information 103 may include a document serial number; properties/metadata related to the document; security information associated with a plurality of users; a log of documents output, scanned, and/or reproduced; IDs of instances of computer 110; IDs of output destinations; etc. In some embodiments, security information 103 includes rules and log files related to generating security alerts and notifying system or security administrators in response to identifying misuse of scanning and/or reproducing documents within networked computing environment 100.

In one embodiment, analytics and algorithms 104 includes one or more programs for determining whether a document includes one or more periodically-varying features based on analyzing a document for descriptions related to periodically-varying features. In another embodiment, analytics and algorithms 104 includes one or more programs that utilize feature recognition to identify non-text features within a scanned document and subsequently determine whether the identified non-text features comprise one or more periodically-varying features that potentially include encoded data. Analytics and algorithms 104 can analyze the one or more identified periodically-varying features to identify the features that encode information and to decode the encoded information. In various embodiments, analytics and algorithms 104 utilizes information within security information 103, such as bit-offset values to encode or decode information associated with periodically-varying features.

Analytics and algorithms 104 includes one or more programs for determining the modifications to apply to a periodically-varying feature within a document to encode information. Alternatively, analytics and algorithms 104 may interface with one or more other programs (not shown), such as a CAD program to modify the definitions or metadata of the segments of a periodically-varying feature to encode information identified by watermarking program 400 and/or document control program 500.

Document watermarking program 400 is a program for modifying features within a document to watermark the document. In one embodiment, document watermarking program 400 identifies a periodically-varying feature within a new document and encodes information within a periodically-varying feature within the documents. In another embodiment, document watermarking program 400 updates a watermark of a watermarked document. In various embodiments, document watermarking program 400 utilizes information and dictates included in security information 103 to determine the information to encode within a watermark of a document. In some embodiments, document watermarking program 400 affects the output of the document, such as dynamically updating one or more sections of a watermark based on information associated with an I/O device (e.g., a device ID, a time stamp, a use ID that initiates the document output). In a further embodiment, one or more aspects of document watermarking program 400 are implemented as firmware (e.g., firmware 131, firmware 136) and/or as executable code installed within various I/O devices of within networked computing environment 100, such as device 130 and/or device 135. In addition, various aspects of document watermarking program 400 are implemented as firmware and/or as executable code installed within an I/O device of networked computing environment 100 that interfaces with an instance of document watermarking program 400 executing on system 102 to update information within security information 103.

Document control program 500 is program that identifies encoded information within a document that is scanned by a user in an attempt to reproduce the document. Document control program 500 can access security information 103 to identify various rules, criteria, and/or security control related to scanning and reproducing the document. In one embodiment, document control program 500 is a hosted program within networked computing environment 100 that monitors activity associated with a plurality of I/O devices that are capable of scanning, copying, and/or reproducing documents, to identify documents that include watermarks that encode information. In another embodiment, document control program 500 monitors the communications within network 140 of networked computing environment 100 to identify and control the reproduction of documents that include encoded information (e.g., watermarks). In other embodiments, one or more aspects of document control program 500 are implemented as firmware and/or as executable code installed within various I/O devices of within networked computing environment 100. In some embodiments, document control program 500 responds to the determination that a document includes information within a watermark by performing one or more actions, such as denying or authorizing the copying of a document, dynamically updating one or more sections of the watermark within a reproduction of the document, logging the scan of the document, updating various security information within security information 103, and/or limiting the reproduction of the document (e.g., a maximum number of copies, preventing the electronic duplication or transmittal of the document, etc.).

Computer 110 includes; information 113, document generation program 115, and various programs and databases (not shown), such as a UI, a web browser, a database program, a CAD program or other editing program that can modify one or more geometric properties of periodically-varying features in response to an instance of document watermarking program 400. In some embodiments, computer 110 includes a version of document watermarking program 400 and/or document control program 500. In an embodiment, information 113 includes information associated with computer 110, such as an ID of the user of computer 110, security and authentication certificates, software IDs, IDs of documents of the user, ID's associated with documents received by the user (e.g., e-mail attachments, downloaded files, etc.), etc.

Document generation program 115 is representative of one or more programs that create or modify a document. Document generation program 115 may be one or more of: a word processing program, a CAD program, a presentation program, a spreadsheet program, etc., which outputs corresponding documents based on various file formats. In one embodiment, document generation program 115 is program installed on computer 110. In another embodiment, document generation program 115 is representative of a web-based application or an interface to a program hosted on another computer (not shown) that is accessible via network 140. In some embodiments, document generation program 115 utilizes aspects of document watermarking program 400 as a macro, an add-in, or a utility. In an example, based on E-DRM requirements or various security rules, document generation program 115 utilizes aspects document watermarking program 400 by default for each document generated or modified by a user of computer 110. Similarly, if a user utilizes computer 110 to execute a scan function of device 135 to import data of one document for inclusion by document generation program 115 to another document, then aspects of document control program 500 initiate.

Repository 120 is representative of a network-attached storage (NAS) system, a storage area network (SAN), a SAN-NAS hybrid system, a storage system based on a cloud infrastructure, or any storage device or system utilized to store a plurality of documents generated within networked computing environment 100 or accessed by users of networked computing environment 100. Documents within repository 120 may be encrypted. In an embodiment, repository 120 is representative of a plurality of storage location administered and controlled by system 102. In various embodiments, repository 120 is partitioned into a plurality of storage locations for documents based on, but not limited to, business functions, project folders, shared/mapped drives, various directory structures, and security ratings.

In one embodiment, device 130 and device 135 are representative of input/output (I/O) devices capable of one or more document processing functions, such as printing, scanning, and/or reproducing documents, in accordance with embodiments of the present invention. Device 130 includes firmware 131 and UI 132. Device 135 includes firmware 136 and UI 137. Device 130 and/or device 135 may also include (not shown): a user interface, an ID card reader (e.g., a near field communication device), and one or more ports to interface with removable storage media (e.g., an SD™ card interface, a compact disk, a universal-serial bus (USB™) port, etc.). In one scenario, device 130 is representative of a printer. In another scenario, device 135 is representative of a multi-function copier. Device 130 and/or device 135 can include other functions that enables a user to digitally reproduce (e.g., copy, scan) a document, such as inputting a value for a number of copies, changing a magnification associated with the scanned document, modifying a contrast factor to apply to a reproduced document, and specifying an output destination for the digital reproduction of the scanned document (e.g., an e-mail address, a fax number, and/or a removable storage device).

In some embodiments, device 130 and/or device 135 are operatively coupled to computer 110 as opposed to communicating via network 140. In some scenarios, utilizing device 130 and/or device 135 executes a software daemon within computer 110 to establish a communication link with system 102 to utilize information and/or software therein. In various embodiments, instances of device 130 and/or device 135 include respective instances of firmware 131 and firmware 136 or other executable code that includes various aspects of document watermarking program 400 and/or document control program 500. Thus, enabling device 130 and/or device 135 to read and decode information within a watermark of a document, respond to the encoded information, and to dynamically update portions of a watermark with or without access to system 102. In addition, firmware 131 and/or firmware 136 may include pre-defined security responses or actions that activate in response to detecting one or more security flags detected (e.g., identified) within a watermark of a document.

In one embodiment, system 102 communicates through network 140 to computer 110, repository 120, device 130, and device 135. Network 140 can be, for example, a local area network (LAN), a telecommunications network, a wireless local area network (WLAN) (e.g., an intranet), a wide area network (WAN), the Internet, or any combination of the previous and can include wired, wireless, or fiber optic connections. In general, network 140 can be any combination of connections and protocols that will support communications between system 102, computer 110, repository 120, device 130, and device 135, in accordance with embodiments of the present invention. In another embodiment, network 140 operates locally via wired, wireless, or optical connections and can be any combination of connections and protocols (e.g., personal area network (PAN), near field communication (NFC), laser, infrared, ultrasonic, etc.). In some embodiments, system 102 may utilize a traffic monitoring program (not shown) to monitor of network 140 to identify the usage of an instance of device 130 and/or device 135 by a user to print, scan, and/or reproduce a document.

Figure 2A:
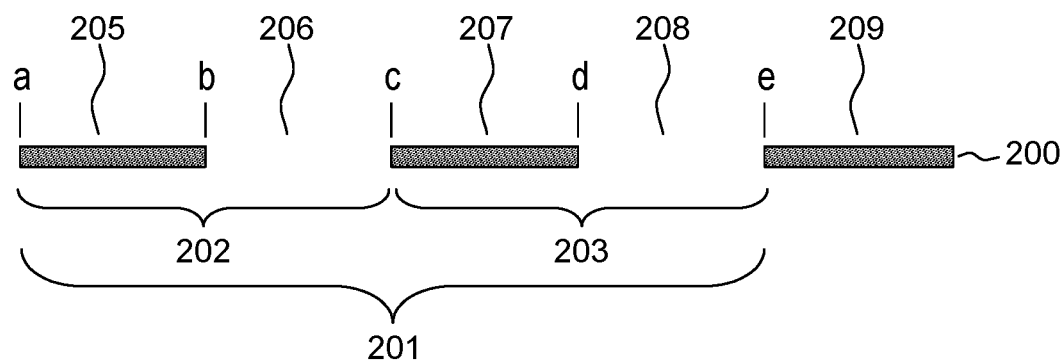
FIG. 2a depicts an illustrative example of a portion of a dashed line from within a document prior to encoding information within segments of the dashed line, in accordance with an embodiment of the present invention.

FIG. 2a depicts an example of a portion of a horizontal dashed line from within a document prior to encoding information within segments of the dashed line, in accordance with an embodiment of the present invention. A document may include a plurality of instances of dashed line 200, which can encode the same information, similar information (e.g., page numbers differ), or different information based on security dictates related to the document. In an illustrative example, dashed line 200 is dashed line including of a plurality of segments of approximately equal percentages (i.e., 50%/50%) of dark (e.g., black) features and blank (e.g., white) space between features.

In some embodiments, the description of dashed line 200 within a document is based on a generalized definition (e.g., a set of geometric properties and parameters), such as a start-point; an end-point; a length of each type of segment, space, or element; a color associated with a segment, a space, or an element; a definition of a set of segments or other elements that form a periodic interval; and a value for the number of repetitions for a periodic interval. In other embodiments, the definition of dashed line 200 within a document is based on other formats known in the art. In this illustrative example, the depicted portion of dashed line 200 includes five horizontal segments: features 205, 207, and 209; and spaces 206 and 208. However, based on the resolution of an output device (e.g., device 130) and the output magnification of the printed document, individual solid features and spaces may not be exactly equal sizes.

In various embodiments, the generalized definition of dashed line 200 is converted to a format that describes the values for various geometric properties, such as discontinuity points (e.g., edges of features or segments) for each segment of dashed line 200 to enable various calculations and modifications related to the segments within dashed line 200. In an embodiment, four segments (features 205 and 207, and spaces 206 and 208) comprise seg(ment)-couple 201. In some embodiments, seg-couple 201 encodes 4 bits of information. In the illustrated embodiment, seg-couple 201 encodes two bits of information within segment pair 202 (feature 205 and space 206). Segment pair 203 (feature 207 and space 208) does not encode information. In addition, segment pair 202 and segment pair 203 theoretically span the same distance, and space 208 is utilized as a reference for seg-couple 201. In the illustrated example, (b−a)=(c−b)=(d−c)=(e−d), where a, b, c, d, and e represent horizontal position values for discontinuity points within the depicted portion of dashed line 200 and associated with at least one page of a document (not shown). In an example, feature 205 begins at horizontal position value a and ends at horizontal position value b. Similarly, space 208 begins at horizontal position value d and ends at horizontal position value e. In another embodiment, seg-couple 201 encodes a single bit of information.

Figure 2B:
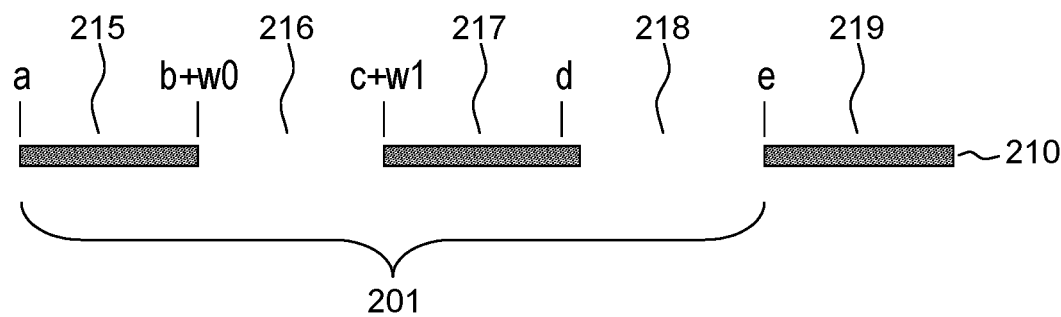
FIG. 2b depicts an illustrative example of effects associated with encoding information within a section of a dashed line utilized to watermark a document, in accordance with an embodiment of the present invention.

FIG. 2b depicts an example of effects associated with encoding information within a seg-couple of a dashed line utilized to watermark a document, in accordance with an embodiment of the present invention. In this illustrative example, the depicted portion of dashed line 210 includes five segments: features 215, 217, and 219; and spaces 216 and 218. Dashed line 210 is representative of the portion of dashed line 200 depicted in FIG. 2a with information encoded utilizing an embodiment of the present invention. In an embodiment, data to be encoded is assigned a bit-offset value where the magnitude of the bit-offset values are the same; however, the sign assigned to a bit-offset value indicates whether the bit encodes data as a "0" or a "1". In the illustrative example, a negative bit-offset value represents a "0" data bit and a positive bit-offset value of represents a "1" data bit. By selecting a bit-offset value for encoding information that is larger than rounding and placement errors related to the resolution of a printer and a resolution value for a scanner, the encoded information is discoverable. Alternatively, a smaller bit-offset value may be selected by increasing the number of bits utilized for error-correcting code algorithms and/or replicating the encoded information within substantially similar within periodically-varying features (e.g., dashed lines) of the document.

Various encoding rules may be applied to features within a dashed line. An encoding rule applied to illustrative example FIG. 2b is indicated by submatrix 310 (discussed in further detail with respect to FIG. 3a). The first bit is encoded by modifying feature 205 by a bit-offset version corresponding to $w_0$ to generate feature 215. In one example, a length value of feature 215=$((b+w_0)-a)$. The second bit is encoded within space 206 by modifying the position of the interface (e.g., discontinuity, edge) between space 206 and feature 207 by a bit-offset version corresponding to $w_1$ to generate space 216. In another example, a length value of space 216=$((c+w_1)-(b+w_0))$. In addition, space 208 (i.e., the fourth segment of seg-couple 201) is a reference feature and the length value (e−d) is unaltered by data encoding.

In an example referring to FIG. 2a, the depicted portion of dashed line 200 includes segments approximately 0.21 cm of length, generating an approximate length value of 0.84 cm for seg-couple 201. For example, if device 130 outputs at a resolution of 600 dpi (e.g., pixels), then the produced segments are 50 pixels wide based on rounding up to an integer pixel value. Assuming that an 8% change in a length of a segment is detectable at a 600 dpi scanning resolution, then a bit-offset value of 4 may be selected to encode information and generate a watermark. To encode bit values (i.e., information) that correspond to (0,0) within respective feature 205 and space 206 with respect to FIG. 2a, $w_0$=−4 and $w_1$=−4. Thus, generating feature 215, feature 217, space 216, and space 218 as depicted in FIG. 2b. In an example, if the starting position value of dashed line 200 is a=0 with a segment length value of W=50 pixels, then encoding (0,0) in seg-couple 201 yields edge location values of a=0, b=46, c=96, d=150, and e=200 pixels. If another pair of bits of information are encoded in the next seg-couple of dashed line 200, then the length value of feature 219 is different from the length value of feature 209 within FIG. 2a.

In a further example, applying the method of encoding information as discussed with respect to FIG. 2b to a dashed footer demarcation line in a document printed on A4 size paper, the dashed footer line may be up to 16 cm (6.3 inches) long. Based on a seg-couple length of approximately 0.847 cm (200 pixels) and segment lengths of approximately of 0.195 cm (46 pixels), 0.212 cm (50 pixels), and 0.229 cm (54 pixels), the differences among which are not detectable to the unaided human eye, up to 38 bits of information can be encoded within a watermarked version of the dashed footer demarcation line without error correction. If heavy error correction (e.g., 30%) is utilized, then 26 bits of information can be encoded in the dashed footer demarcation line. Further, as previously discussed, if multiple dashed lines are available within a page (e.g., header demarcation lines, table frames, figure frames, etc.), then the potential quantity of encoded information (e.g., watermarks) increases.

Alternatively, the potential quantity of data may be reduced if portions of a dashed line or other periodically-varying feature utilized to encode information are reserved to indicate different sections of data within a watermark, such as an original document ID section, a security section, a printed document serial number section, an output device ID section, and a user ID section, where each section or information start point is separated (e.g., identified, demarcated) by a preset number of seg-couples with a specific set of geometric properties (e.g., metadata). In some scenarios, the seg-couples utilized to separate or delineate sections do not encode information. In another scenario, the separator seg-couple may be modified based on a specific rule, such as all four segments of each separator seg-couple is shortened by half of the bit-offset value. Similarly, if the dashed line style that encodes information repeats across a different number of features (e.g., more than four segments or elements per seg-couple), then for some dashed line styles the potential quantity of encoded information decreases.

Figure 2C:
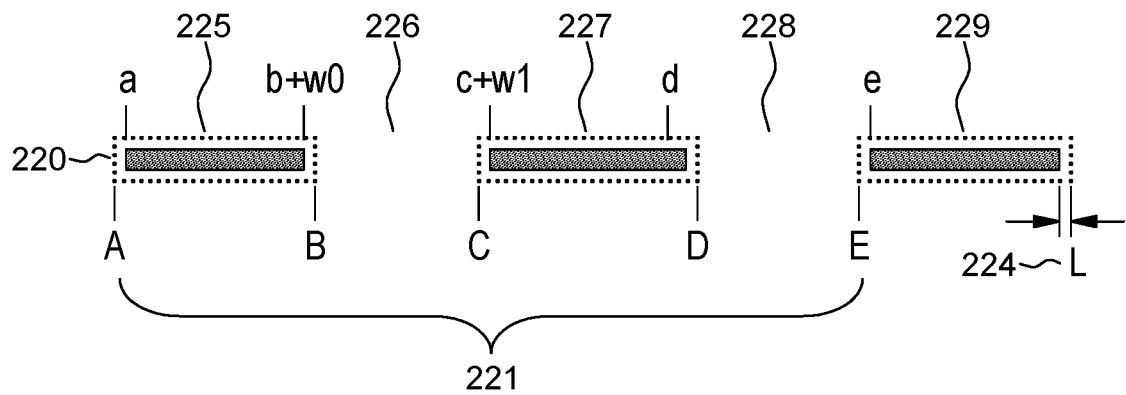
FIG. 2c depicts an illustrative example of effects associated with applying a contrast factor and the related effects to a dashed line utilized to watermark a document, in accordance with an embodiment of the present invention.

FIG. 2c is an illustrative example of applying contrast (e.g., darkening) to an output of a document (not shown) and the related effects to information encoded within a dashed line utilized to watermark the document, in accordance with an embodiment of the present invention. Dashed line 220 represents an arbitrary portion of dashed line 210 that includes encoded information and a contrast factor that expands the areas corresponding to printed elements (e.g., text, dark features, etc.) within the document. In the depicted example, element 224 (L) indicates an approximate amount of increase in dark features associated with applying a contrast factor to the output of a document. Since L is applied uniformly (within a threshold based on printer resolution and rounding effects) across a page of the output document, seg-couple 221 is approximately as long as seg-couple 201 of FIG. 2b. The position values for the edges of seg-couple 221 are theoretically: A=a−L,B=b+L+$w_0$, C=c+$w_1$−L,D=d+L, and E=e−L. If the relationship of the segments that comprise dashed line is known, such as a 50%/50% feature to space ratio; then the values for $w_0$ and $w_1$ can be calculated and the corresponding sign indicates the bit value of the encoded information. For example: $w_0$=((E−A)/2)−(D−B) and $w_1$=((E−A)/2)−(E−C). If the original bit-offset value is large enough to overcome round-offs and random measurement noise, then the encoded data is recoverable.

Figure 3A:
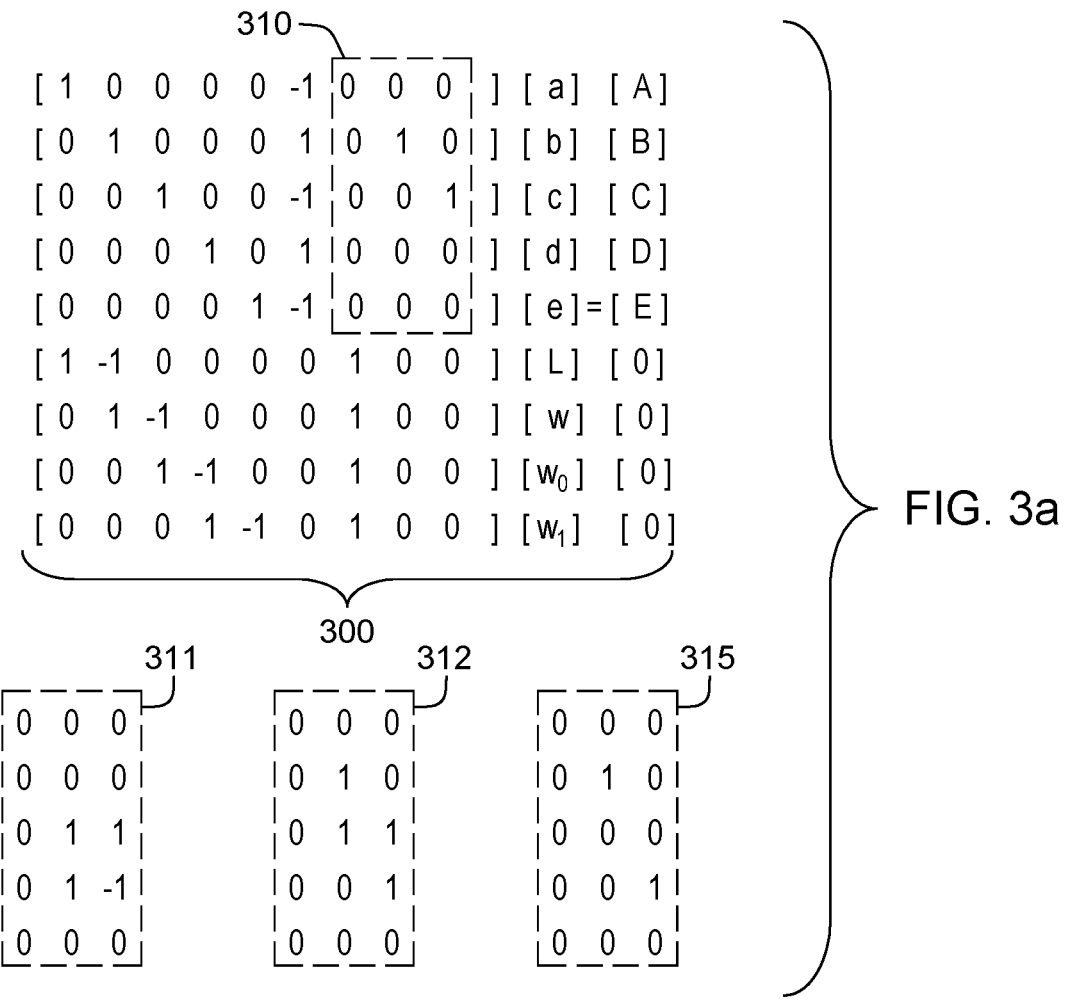
FIG. 3a depicts an illustrative example of matrix notation utilized apply an encoding method to a dashed line, in accordance with an embodiment of the present invention.

FIG. 3a depicts matrix notation for representing encoding information within a seg-couple of a dashed line utilizing four segments, in accordance with an embodiment of the present invention. Based on the formulation of encoding data in a dashed line as discussed above with respect to FIGS. 2a, 2b, and 2c, the elements and method to encode information are generalized for representation by matrix 300. Submatrix 310 (dashed box) represents the embedding rule/method utilized within the illustrative example of FIG. 2b that produces a matrix that is invertible. Submatrix 310 is a submatrix of coefficients that indicates the edges of features within seg-couple 201 that are affected by bit-offset values to encode information. With respect to submatrix 310, edges a, d, and e are unaffected (0); and edges b and c are affected (1) by the bit-offset value utilized to encode information. Similarly, submatrices 311 and 312 (dashed boxes) may be substituted for submatrix 310 to produce other matrices that are invertible based on different encoding methods (e.g., coefficients). However, submatrix 315 (dashed box) may provide an encoding solution, but the resultant matrix is not invertible and therefore does not generate a decoding solution.

Figure 3B:
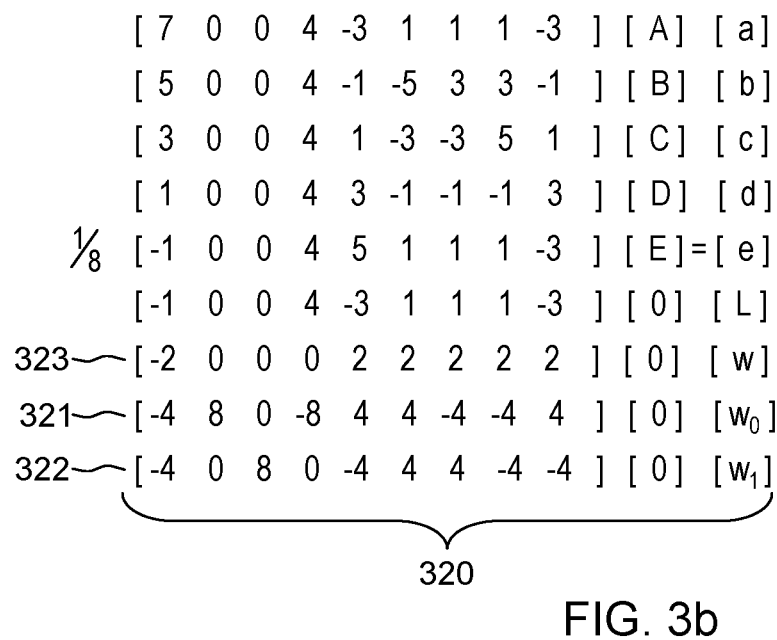
FIG. 3b depicts an illustrative example of an inverse matrix utilized to generate decoding solutions for information encoded within a dashed line, in accordance with an embodiment of the present invention.

FIG. 3b depicts an inversion of matrix 300, in accordance with an embodiment of the present invention. In an illustrated embodiment, matrix 320 is an inversion of matrix 300 utilizing the information within submatrix 310. Based on the information within row 321 the decoder for $w_0$ can be determined: ⅛*(−4*A+8*B+0*C−8*D+4*E)=((E−A)/2)−(D−B). Based on the information within row 322, the decoder for $w_1$ can be determined: ⅛*(−4*A+0*B+8*C+0*D−4*E)=((E−A)/2)−(E−C)

Similarly, (referring to FIG. 3a) applying the embedding method depicted in submatrix 311 to matrix 300 generates different decode solutions where $w_0$=(A+D−B−E)/2) and $w_1$=(B+C−A−D)/2. In addition, applying the embedding method depicted in submatrix 312 to matrix 300 generates different decode solutions where $w_0$=(B+C−A−D)/2 and $w_1$=(C+D−B−E)/2.

In a further embodiment, multibit information is represented by $w_0$ and $w_1$. Two bits can be encoded in each segment by mapping the four-bit combination values to bit-offset values proportional to example sequence−3, −1, 1, and 3. Such a sequence produces results that maintain the same distance between successive values. The decoder with respect to this example sequence is based on dividing the values of $w_0$ and $w_1$ by the length +/−1 expected bit-offset value. The bit-offset values are pre-established values that are proportional to the original length (W) parameter, which is recoverable by using row 323 of inverse matrix 320 where W=(E−A)/4. In addition, the method for determining bit-offset value is based on the sign of the recovered result and comparing the result to a magnitude value of 2. A result value less than 2 indicates a bit-offset value associated with 1 and a result value greater than 2 indicates a bit-offset value associated with 3. Similarly, a result of −0.8 indicates a bit-offset value associated with −1, and a result of −2.5 indicates a bit-offset value associated with −3.

In various embodiments, if the percentage of features to spaces in a dashed line or other repetitive feature utilized to encode information to generate a watermark is not known a priori, then the quantity of encoded information decreases to one bit per seg-couple. Each seg-couple of the dashed line or other repetitive feature is individually analyzed. However, if the entire dashed line is analyzed at one time and an approximation for the percentages of features to spaces is determined, then a two bit per seg-couple encoding density is maintained.

Figure 4:
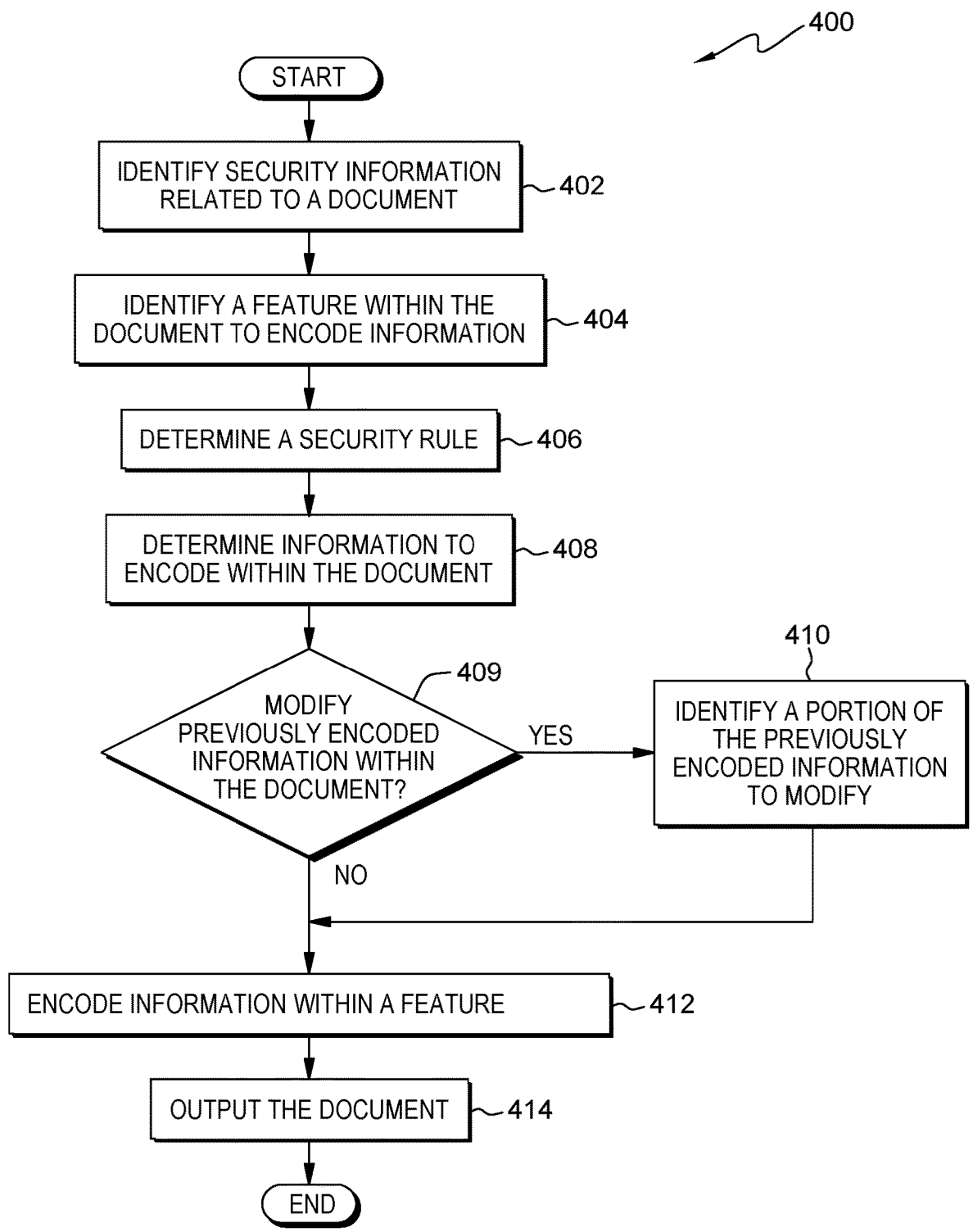
FIG. 4 depicts a flowchart of the operational steps of a document watermarking program, in accordance with an embodiment of the present invention.

FIG. 4 is a flowchart depicting operational steps for document watermarking program 400, a program that encodes information (i.e., watermarks) within features of a document in accordance with an embodiment of the present invention. In one embodiment, document watermarking program 400 executes in response to executing one or more programs that generate a document. In another embodiment, document watermarking program 400 executes in response to receiving a request from an I/O device within networked computing environment 100 to print a document. In some embodiments, document watermarking program 400 executes in response to a dictate to apply a watermark one or more documents stored within repository 120. In various embodiments, document watermarking program 400 operates recursively based on one or more criteria, such as obtaining a number of copies to print and uniquely watermarking each copy of the document. In other embodiments, aspects of document watermarking program 400 are included within executable coded of an I/O device.

In step 402, document watermarking program 400 identifies security information related to a document. Security information related to a document may include, but is not limited to: a security classification, an ID (e.g., serial number, DRM information) of the document, an ID of the creator of the document, an ID of user that prints a document, an ID of a user that modifies the document, an ID of computer 110, an ID and location of an I/O device that prints the document (e.g., device 130). In one embodiment, document watermarking program 400 identifies security information related to a document, such as properties of the document input by a user to document generation program 115; and information related to the user within information 113.

In another embodiment, document watermarking program 400 identifies security information related to a document based on another program (not shown) that analyzes the content of the document, such as a keyword search, sematic, or cognitive text analysis. In some embodiments, document watermarking program 400 identifies security information related to a document based on information stored within security information 103, such as information already encoded within the document. In other embodiments, document watermarking program 400 identifies security information related to a document based on information associated with the storage of the document, such as a project folder, a shared drive, a naming convention, etc.

In step 404, document watermarking program 400 identifies a feature within the document to encode information. Document watermarking program 400 identifies a periodically-varying feature within a document based on a feature description associated with a document type and/or a file format corresponding to the document or by utilizing a feature recognition program (not shown). Document watermarking program 400 also identifies a feature definition and/or a set of geometric properties and related parameters corresponding to the identified feature.

In one embodiment, document watermarking program 400 identifies a periodically-varying line within one or more pages of a document, such as a boarder feature, a frame, and a section (e.g., header, footer, letterhead, etc.) demarcation feature. In another embodiment, document watermarking program 400 identifies a periodically-varying line within one or more structural features within a document, such as lines included within a table; lines forming cells of a spreadsheet; and/or indicator lines within a technical drawing (e.g., a CAD figure, an architectural blueprint, etc.). In other embodiments, document watermarking program 400 identifies other types of periodically-varying features within the document, such as a boarder or frame based on a repeating pattern (e.g., a checker-board pattern, a diagonal hash).

In some embodiments, document watermarking program 400 identifies multiple periodically-varying lines or features within a document for one or more purposes. In one scenario, document watermarking program 400 identifies multiple periodically-varying lines within a document to utilize for error-correcting. In another scenario, document watermarking program 400 identifies multiple periodically-varying lines within a document to store redundant copies of encoded information (e.g., watermark) to reduce the probability of losing the encoded information. In some scenarios, document watermarking program 400 identifies multiple periodically-varying lines based on a determination that a single feature is too limited (e.g., small, short) to encode the information dictated by one or more security rules. In other scenarios, document watermarking program 400 identifies multiple periodically-varying lines within a document store redundant copies of encoded information to compensate for visual interference by other features within the document (e.g., intersection points of horizontal and vertical lines associated with spreadsheet cells).

Still referring to step 404 in an alternate embodiment, if document watermarking program 400 cannot identify a periodically-varying feature within the document, then document watermarking program 400 inspects the document for one or more features to convert to a periodically-varying feature, which includes a plurality of segments or shapes. In an example, document watermarking program 400 inspects a document and identifies a composite line style utilized within the document. Document watermarking program 400 utilizes an ancillary program, such as a CAD program, to convert the identified feature into a periodically-varying feature, such as dividing the composite line into a plurality of segments and varying the width (i.e., thickness) of one or more pairs of segments of the lines as opposed to adding gaps (e.g., white spaces) between segments.

In step 406, document watermarking program 400 determines a security rule. In various embodiments, document watermarking program 400 determines one or more security rules based on information previously identified in step 402. In one embodiment, document watermarking program 400 determines one or more security rules based on various dictates, criteria, hierarchies of priority, etc., stored within security information 103. In an example, document watermarking program 400 determines a set of security rules based on a combination of various criteria, such as DRM rules, E-DRM rules, a security level of the document, limiting a number of copies of the document, identifying users that have access to the document, information to append, etc.

In other embodiments, document watermarking program 400 determines a security rule related to the amount of information that is encoded within the watermark feature applied to the document, such as the number of bits encoded, an error-correcting scheme, dictates associated with replicated extra copies of watermark information, parsing the information to be included within the watermark (e.g., creating section and subsections for elements of information), the IDs of users associated with the document, and IDs and locations of devices associated with the document. A set of security rules associated with the document may dictate the inclusion of information, such as a serial number, an expiration date, a security level code, an output device ID, appended user information, one or more action flags, etc.

In step 408, document watermarking program 400 determines information to encode within the document. In response to determining information to encode, document watermarking program 400 converts the information to a binary format. In addition, document watermarking program 400 stores and/or updates one or more tables or databases within security information 103 with a copy of the information to encode within the document. In one embodiment, document watermarking program determines information to encode within the document based on one or more security rules and security information related to the document. In another embodiment, document watermarking program 400 identifies the quantity of information to encode within the document.

In various embodiments, document watermarking program 400 also identifies aspects of the structure of the watermark utilized to encode the information, such as separators or demarcation features (e.g., information start indicator, section or subsection start/stop indicators, etc.); a definition of the sections and subsections of the watermark and information to encode within a section or subsection; a number of bits of information to encode within a seg-couple; an error-correcting scheme; and the parameters associated with the one or more geometric properties that are modified to encode information within a seg-couple. In one example, document watermarking program 400 utilizes various criteria or hierarchies of priority associated with encoded data to determine the information to encode within the one or more identified features and which information to exclude, based on the identified features available to convert to a watermark (e.g., bit limit based on the number of segments available for encoding information). Further, document watermarking program 400 may determine to prioritize encoding a more complete set of information within a watermark as opposed to utilizing a stronger error-correcting scheme (e.g., one that consumes more bit locations/feature segments).

Still referring to step 408, in other embodiments, document watermarking program 400 determines that the document includes previously encoded information within one or more sections or subsections of a watermark included in the document, based on information stored within security information 103. In some embodiments, document watermarking program 400 determines changes to the information to encode within the document, such as identifying a dictated limiting the number of copies of a document and decrementing the encoded value, or E-DRM information changes based on updates to information included within the document.

In decision step 409, document watermarking program 400 determines whether to modify previously encoded information within the document. In one embodiment, document watermarking program 400 determines whether to modify previously encoded information within the document based on one or more security rules. In another embodiment, document watermarking program 400 determines to modify previously encoded information within the document based on a user updating or replacing a version of the document stored within repository 120. In some embodiments, document watermarking program 400 determines to modify previously encoded information within the document based on encoding additional information within one or more sections or subsections of a watermark (e.g., periodically-varying feature) that are currently do not store encoded information. In addition, document watermarking program 400 may determine whether to modify previously encoded information within the document based on one or more attributes related to outputting the document, such as a time stamp, and/or a serial number.

In various embodiments, document watermarking program 400 determines not to modify previously encoded information within the document based on other security rules or criteria, such as a lack of changes to a document with a low security rating that is reprinted by the same user. In other embodiments, if document watermarking program 400 determines that the document lacks encoded information, then document watermarking program 400 skips to step 412.

Responsive to determining to modify encoded information within the document (Yes branch, decision step 409), document watermarking program 400 identifies a portion of the encoded information to modify (step 410).

In step 410, document watermarking program 400 identifies a portion of the previously encoded information to modify. Document watermarking program 400 may utilize one or more tables or databases within security information 103 to determine the sections and subsections of a watermark that currently include encoded information and the corresponding information therein encoded. In various embodiments document watermarking program 400 determines which section or subsection of a watermark to modify based on one or more other security rules. In one embodiment, document watermarking program 400 identifies a portion (e.g., section or subsection) of a watermark that includes encoded information to modify. In another embodiment, document watermarking program 400 identifies a portion of a watermark to modify that does not include previously encoded information, such as an output device ID field that is dynamically updated in response to the printing the document to device 130 but not modified in response to storing the document to repository 120.

Referring to decision step 409, responsive to determining not to modify encoded information within the document (No branch, decision step 409), document watermarking program 400 encodes information within a feature (step 412). Alternatively, if document watermarking program 400 determines that the document lacks encoded information, then document watermarking program 400 encodes information within a feature (step 412).

In step 412, document watermarking program 400 encodes information within a feature. Document watermarking program 400 may utilize one or more aspects of analytics and algorithms 104 to convert the identified feature to a plurality of seg-couples utilized to encode information. In addition, document watermarking program 400 determines various information utilized by analytics and algorithms 104, such as bit-offset values and encoding rules (e.g., submatrix 310). In one embodiment, document watermarking program 400 encodes information within an identified feature or a converted feature, such as a seg-couple of a periodically-varying feature by modifying one or more geometric properties as previously discussed with respect to FIGS. 2a and 2b based on a value corresponding to the bit to encode. In various embodiments, document watermarking program 400 encodes information within a set of features corresponding to a section or subsection of defined for a watermark. In some embodiments, document watermarking program 400 determines a set of error-correcting code information that is respectively associated with information included within a portion of a watermark and encodes the error-correcting code information within another section of the watermark. Error-correcting code information is similarly encoded by modifying one or more geometric properties of the seg-couples within a section of the watermark designated for error correction.

In another embodiment, document watermarking program 400 encodes information within multiple replicas of the same feature. In one scenario, document watermarking program 400 repeats the encoding of information within replicas of the same feature for redundancy and/or error corrections. In an example, document watermarking program 400 determines that a horizontal dashed line is repeated within a table 20 times (e.g., instances). Document watermarking program 400 may encode (e.g., watermark) 10 instances of the 20 horizontal dashed lines uniformly so that in response to identifying the 10 lines of encoded information, that if a segment of at least 6 of 10 lines decodes as a "1", then the information stored within the segment is decoded as a "1."

In another scenario, document watermarking program 400 reproduces the encoding of information within replicas of an identified feature utilizing a "shift and rotate" scheme. In an example, to reduce the probability of losing information where a horizontal seg-couple is crossed by a vertical feature, document watermarking program 400 begins encoding information after an information start indicator of a first instance of the identified feature. In each subsequent feature, document watermarking program 400 copies the modifications corresponding to the last 10 seg-couples of the previous watermark, appends the copied modifications to the beginning (i.e., left portion) of the current feature, shifts each segment modification 10 seg-couples to the right within the current feature, and deletes the last 10 seg-couples of modifications from the feature. Subsequently, document watermarking program 400 repeats the process for a dictated number of replicas of the identified feature.

In step 414, document watermarking program 400 outputs the document. The output document includes some or all of information encoded within the document. In various embodiments, in response to outputting the document watermarking program 400 updates security information 103 with information related to the document, such as encoded information, a user ID, an output destination (e.g., device ID, Fax number, e-mail ID, etc.), etc.

In one embodiment, document watermarking program 400 outputs the watermarked document as a file to repository 120. In another embodiment, document watermarking program 400 outputs the watermarked document to device 130, such as a laser printer connected to computer 110. In some embodiments, one or more aspects of document watermarking program 400 within firmware dynamically updates a portion of the watermark at the device (e.g., firmware 131 of device 130) that prints the document, such as applying a current timestamp, printer ID, or ID of the user utilizing device 130 to print the document. In other embodiments, document watermarking program 400 outputs the document as a file (e.g., an e-mail attachment) that is communicated to another computer (not shown). In various embodiments, document watermarking program 400 outputs the document to a combination of locations and devices.

Figure 5:
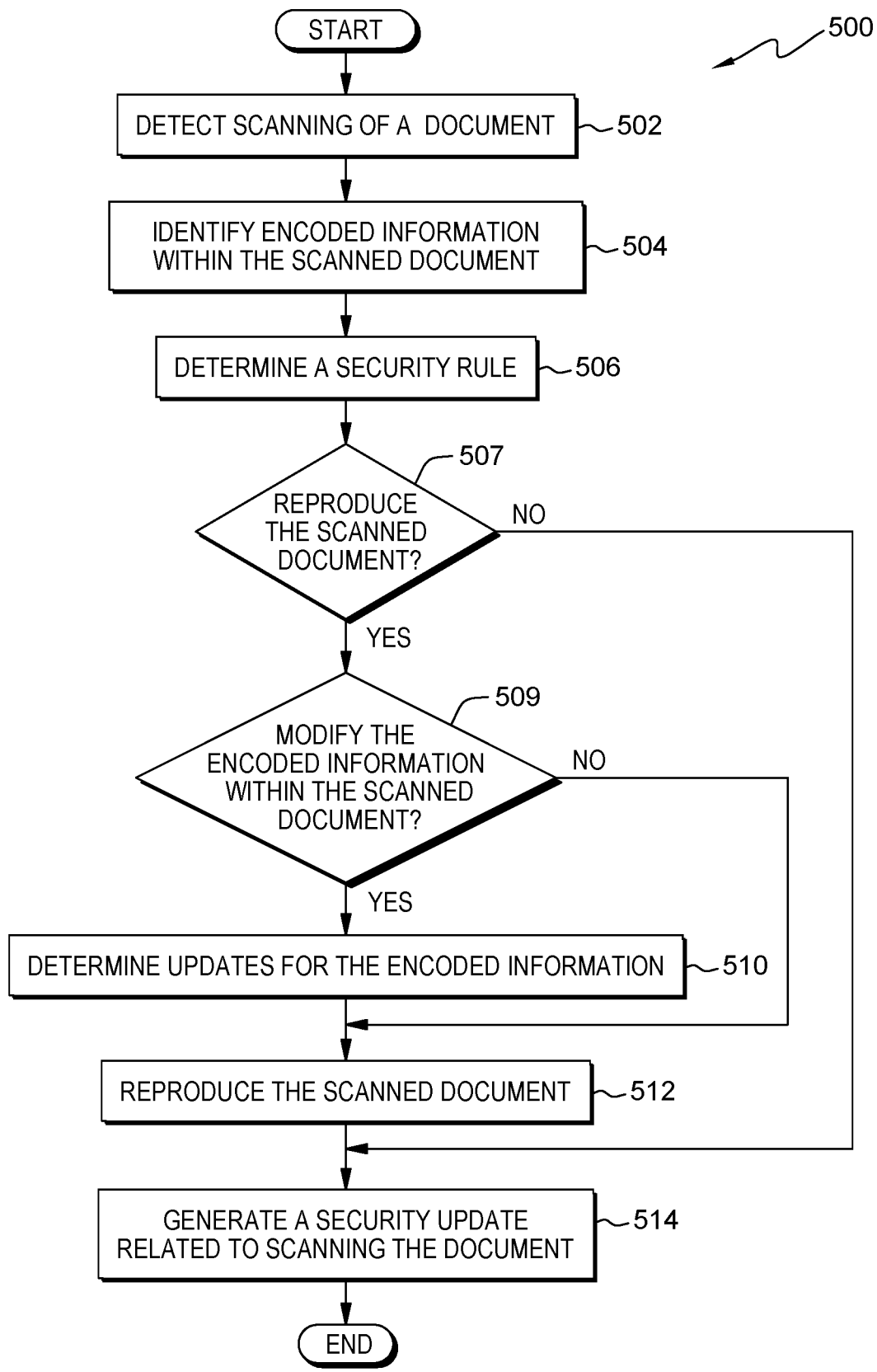
FIG. 5 depicts a flowchart of the operational steps of a document control program, in accordance with an embodiment of the present invention.

FIG. 5 is a flowchart depicting operational steps for document control program 500, a program that identifies encoded information within a document and determines a response to an attempt by a user to reproduce the document, in accordance with an embodiment of the present invention. In one embodiment, document control program 500 is a hosted program within networked computing environment 100 that monitors activity associated with a plurality of I/O devices that scan and/or reproduce documents. In some embodiments, document control program 500 monitors the communications within network 140 of networked computing environment 100 to identify and control the reproduction of documents that include encoded information (e.g., watermarks). In various embodiments, one or more aspects of document control program 500 are implemented as firmware (i.e., firmware 136) and/or as executable code installed within various I/O devices of within networked computing environment 100.

In step 502, document control program 500 detects scanning of a document. In one embodiment, document control program 500 detects scanning of a document by device 135 in response to a user initiating to create a physical reproduction (i.e., copy) of the document. In another embodiment, document control program 500 detects scanning of a document by device 135 in response to a user initiating to create an electronic reproduction of the document, such as a fax, or a digital file. In a different embodiment, document control program 500 detects a user reproducing an electronically stored document (e.g., a file) utilizing device 135. In an example, device 135 includes one or more ports that are utilized to connect to a removable storage device, such as a flash-memory card or a USB™ drive. Document control program 500 detects a user attempting to reproduce a document stored on a removable storage device connected to device 135. The file of the stored document may include metadata or properties to further identify the electronically stored document, which document control program 500 communicates to security information 103 of system 102.

In various embodiments, document control program 500 identifies information related to scanning the document, such as an ID corresponding to the user scanning the document, an ID (e.g., name and/or internet protocol (IP) address) associated with device 135, a destination to upload the electronic reproduction of the document, a device to store the output the digital file (e.g., a flash memory device), etc. Document control program 500 also identifies parameters related to reproducing the document that a user inputs to device 135, such as a number of copies, a change in magnification, a change in a size of paper for reproducing the document, a change to the contrast (e.g., lighter, darker) of the reproduced document, a change in tone (e.g., color to black & white), etc. In some embodiments, document control program 500 utilizes information associated with the user scanning the document and/or information associated with the document to obtain additional information from security information 103.

In step 504, document control program 500 identifies encoded information within the scanned document. In one embodiment, document control program 500 receives portions of the scanned document from device 135 to identify encoded information within the scanned document. Document control program 500 may access security information 103 to identify and/or compare information within a table or database to determine other information associated with the documents. In another embodiment, one or more aspects of document control program 500, included within firmware 136 of device 135, identifies a portion of encoded information within the scanned document. In response to identifying encoded information within a document, aspects of document control program 500 executing within device 135 establish communications with system 102 to interface with other aspects document control program 500 and obtain information and securities rules related to the scanned document and the user. In some embodiments, document control program 500 identifies one or more copies or portions of encoded information within the scanned document, such as replicas of the same feature or distributing dictated information among multiple smaller features (e.g., watermarks).

In various embodiments, document control program 500 utilizes one or more techniques previously discussed with respect to FIGS. 2c, 3a, and 3b to identify, analyze, and determine the content of the encoded information within the scanned document. Document control program 500 may utilize one or more aspects of analytics and algorithms 104 to decode information within a watermark included in a document. In one scenario, document control program 500 utilizes an error-correcting code algorithm to determine the content of the encoded information identified within the scanned document. In an example, the scanning surface (not shown) of device 135 may be contaminated with dust, fingerprints, scratches, etc. that distorts or renders one or more seg-couples within a watermark as unreadable or ambiguous. In another example, if a user offsets a page of the document on the scanning surface of device 135 to enlarge a portion of the document, then document control program 500 may only be able to identify a portion of the encoded information. In another embodiment, if document control program 500 does not identify encoded information within at least one page of the scanned document, then document control program 500 terminates.

In step 506, document control program 500 determines a security rule. Various security rules utilized by document control program 500 may be stored within security information 103. Other security rules utilized by document control program 500 may be included within firmware 136, such action flags that indicate whether to perform one or more predefined actions. In one embodiment, document control program 500 determines a security rule based on information encoded within the document, such a control code string (e.g., one or more action flags) associated with the reproduction of the document. Examples of a security rule associated with a control code or action flag include: do not reproduce, maximum number of copies, do not create a digital file (i.e., softcopy), and an expiration date for the document (e.g., do not reproduce after this date). In another embodiment, document control program 500 determines a security rule related to the user scanning the document. In an example, device 135 initiates in response to a user scanning the ID badge of the user and establishes a network connection to system 102. Based on constraints or security information associated with the user (e.g., stored within security information 103), document control program 500 determines one or more other security rules that are applied to the user scanning and/or reproducing a document, such as do not reproduce at an unsecured device.

In various embodiments, document control program 500 determines one or more responses to the scanning and/or reproducing of a document based on one or more security rules and identified information associated with a document and/or the user scanning and/or reproducing the document. Document control program 500 may determine that the scanned document is: reproduced without constraints, reproduced with constraints, or not reproduced. In one scenario, document control program 500 determines to reproduce the scanned document with constraints. In an example, document control program 500 may authorize the reproduction of the scanned document in one format but not another format, such as enabling hardcopies; while disabling digital copies (e.g., faxes, save as file, etc.). In another scenario, document control program 500 determines to reproduce the scanned document based on one or more constraints associated with modifying encoded information with the document.

In decision step 507, document control program 500 determines whether to reproduce the scanned document. In one embodiment, document control program 500 determines to reproduce the scanned document and transmits one or more commands to device 135 enabling (e.g., authorizing) the reproduction of the scanned document. In another embodiment, document control program 500 determines not to reproduce the scanned document and transmits one or more other commands to device 135 inhibiting (e.g., denying) the reproduction of the scanned document. In some embodiments, aspects of document control program 500 included within device 135 identifies a security flag and inhibits the reproduction of the scanned document. Responsive to determining to reproduce the scanned document (Yes branch, decision step 507), document control program 500 determines whether to modify the encoded information within the scanned document (decision step 509).

In decision step 509, document control program 500 determines whether to modify the encoded information within the scanned document. In one embodiment, document control program 500 determines to modify the encoded information within the scanned document based on a determination related to one or more security rules, information associated with the document, and information associated with the user attempting to reproduce the document (step 506). In another embodiment, document control program 500 determines to modify the encoded information within the scanned document for each copy of the document that is reproduced.

Responsive to determining modify the encoded information within the scanned document (Yes branch, decision step 509), document control program 500 determines updates for the encoded information (step 510).

In step 510, document control program 500 determines updates for the encoded information. In various embodiments, document control program 500 may utilize one or more aspects previously discussed with respect to document watermarking program 400 to modify a set of geometric properties of one or more seg-couple to add and/or modify information encoded within a watermark included in a reproduction of the scanned document. In one embodiment, document control program 500 determines one or more updates for the encoded information within the scanned document based on one or more security rules or information obtained from security information 103, and/or information associated with the user, such as an ID of the user, the ID of device 135, and a timestamp. Document control program 500 may apply the same updates to all the reproduction (e.g., copies) of the scanned document. In another embodiment, document control program 500 determines one or more updates for the encoded information within the scanned document based one or more security rules and/or information associated with the user, where one or more different updates are applied to each subsequent copy. In some embodiments, document control program 500 determines that a constraint occurs and ceases updating the encoded information and reproducing the scanned document (e.g., maximum number of copies created).

Referring to decision step 509, responsive to determining not modify the encoded information within the scanned document (No branch, decision step 509), document control program 500 reproduces the scanned document (step 512).

In step 512, document control program 500 reproduces the scanned document. Document control program 500 authorizes device 135 to reproduce the scanned document as one or more formats (e.g., hardcopy, softcopy, etc.). In one embodiment, document control program 500 authorizes device 135 to reproduce the scanned document without modification based on information related to the scanned document, one or more security rules, and information associated with the user reproducing the scanned document. In one example, document control program 500 determines that the scanned document has a low security classification and that the user may reproduce the scanned document without restrictions and/or constraints, such as unlimited number of copies, reproducing only a part of the document, faxing the document to another instance of device 135, and/or converting the document to a digital format (e.g., an e-mailed file, a file stored on a persistent storage device removable from device 135). In another example, document control program 500 reproduces the scanned document based on one or more constraints and/or restrictions, such as limiting the number of copies, reproduced pages must contain a watermark (e.g., encoded information), etc.

In another embodiment, document control program 500 reproduces the scanned document based on one or more updates to the encoded information. Document control program 500 may also apply one or more constraints and/or restrictions to reproducing the scanned document. In one example, document control program 500 modifies each copy of the scanned document with updated encoded information, such as another serial number, an ID of device 135, an ID of the user, a timestamp, etc. within various sections of the watermark of the scanned document. Document control program 500 may stop the reproduction of the scanned document in response to identifying an occurrence of one or more constraints, such as a maximum number of copies are reproduced. In some embodiments, document control program 500 applies one or more security measures to a document that is digitally reproduced, such as encrypting the file generated in response to scanning the document to removable storage media (e.g., a SD™ card) utilized by device 135.

Referring to decision step 507, responsive to determining not to reproduce the scanned document (No branch, decision step 507), document control program 500 generates a security update related to scanning the document (step 514).

In step 514, document control program 500 generates a security update related to scanning the document. In some embodiments, document control program 500 updates security information 103 to include information related to scanning and reproducing the document, such as ID of the document scanned, a serial number for each copy reproduced, an ID of the user that scanned the document a timestamp, an ID of the user that scanned the document, an ID/location of the instance of device 135, and/or one or more modifications to the information encoded within a copy of the scanned document.

In some embodiments, document control program 500 generates a security update related to scanning the document in response to not reproducing the scanned document. Document control program 500 may also transmit a notification to administrator or security personnel associated with system 102 that includes information related to the scanned document that is not reproduced, such as a document ID, a document serial number, a timestamp, an ID of the user that scanned the document, and an ID and/or location of the instance of device 135 that scanned the document. In some scenarios, document control program 500 generates a security update that is logged within security information 103 without notifying a user that scanned the document. In other scenarios, document control program 500 generates a security update that is logged within security information 103 and notifies a user via UI 137 of device 135 of one or more reasons why the scanned document is not reproduced, such as an occurrence of reproducing a maximum number of copies, or the document has expired.

Figure 6:
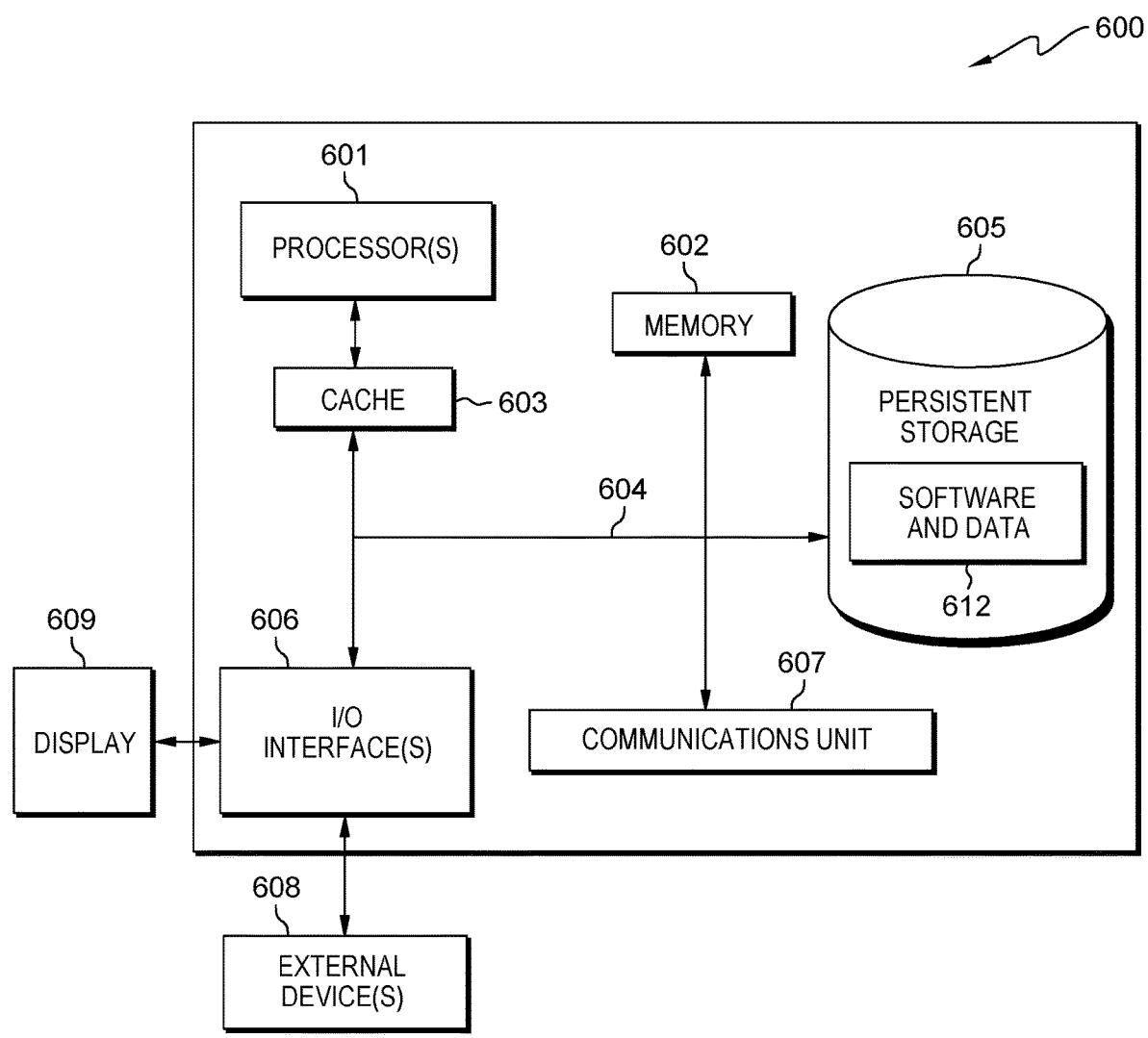
FIG. 6 is a block diagram of components of a computer, in accordance with an embodiment of the present invention.

FIG. 6 depicts computer system 600, which is representative of system 102, computer 110, repository 120, device 130, and device 135. Computer system 600 is an example of a system that includes software and data 612. Computer system 600 includes processor(s) 601, memory 602, cache 603, persistent storage 605, communications unit 607, I/O interface(s) 606, and communications fabric 604. Communications fabric 604 provides communications between memory 602, cache 603, persistent storage 605, communications unit 607, and I/O interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information. With respect to instances of repository 120 persistent storage 605 includes a plurality of storage devices (not shown).

The media used by persistent storage 605 may also be removable. For example, a removable hard drive may be used for persistent storage 605. Other examples include optical and magnetic disks, thumb drives, flash memory, and smart cards that are inserted into a drive for transfer onto another computer readable storage medium that is also part of persistent storage 605. Software and data 612 are stored in persistent storage 605 for access and/or execution by one or more of the respective processor(s) 601 via cache 603 and one or more memories of memory 602. With respect to system 102, software and data 612 includes security information 103, analytics and algorithms 104, document watermarking program 400, document control program 500, and various information, programs and databases (not shown). With respect to computer 110, software and data 612 includes information 113, document generation program 115, and various information, and programs (not shown). Software and data 612 may also include local instances of document watermarking program 400 and document control program 500. With respect to repository 120, software and data 612 includes a plurality of documents, information, and programs (not shown). With respect to instances of device 130 and/or device 135, software and data 612 respectively include firmware 131 and UI 132, and firmware 136 and UI 137; and various programs and databases (not shown). In some embodiments, with respect to instances of device 130 and device 135 and software and data 612 includes one or more aspects of document watermarking program 400 and/or document control program 500.

Communications unit 607, in these examples, provides for communications with other data processing systems or devices, including resources of system 102, computer 110, repository 120, device 130, and device 135. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607 of data processing systems and/or devices.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Software and data 612 used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor. Display 609 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for encoding information within a feature of a document, the method comprising:
   determining, by one or more computer processors, information to encode within a document;
   identifying, by one or more computer processors, a feature within the document to encode information within based, at least in part, on metadata of the document corresponding to the feature;
   determining, by one or more computer processors, a set of geometric properties of one or more segments of the identified feature;
   encoding, by one or more computer processors, a first bit of information of the determined information within a first segment of the feature within the document by modifying one or more geometric properties respectively associated with the first segment; and
   outputting, by one or more computer processors, the document with information encoded within the first segment.

2. The method of claim 1, wherein the identified feature is a periodically-varying feature based on a combination of two or more segments of alternating contrasts that repeat based on an interval of occurrences associated with a definition of the periodically-varying feature.

3. The method of claim 1, wherein determining information to encode within the document further comprises:
   determining, by one or more computer processors, a set of security rules associated with the document;
   determining, by one or more computer processors, a first information to encode within the document based on a first security rule of the determined set of security rules; and
   identifying, by one or more computer processors, a first portion of the identified feature to encode the first information.

4. The method of claim 2, wherein the combination of two or more segments of alternating contrast includes a segment that is a reference segment that does not encode information and includes at least one geometric property unaffected by encoding information within other segments of the combination of two or more segments.

5. The method of claim 1, wherein modifying the one or more geometric properties respectively associated with the first segment is based on a value related to encoding information and a sign of the value that corresponds to a binary value corresponding to a bit of information to encode.

6. The method of claim 1, further comprising:
   storing, by one or more computer processors, a copy the determined information to encode within the document to a network-accessible database, wherein the determined information is respectively associated with an instance of the document; and
   converting, by one or more computer processors, the determined information to encode within the document to binary format.

7. The method of claim 3, further comprising:
   identifying, by one or more computer processors, a second security rule that dictates utilizing an error-correction scheme in conjunction with encoding the determined information;
   determining, by one or more computer processors, based on the error-correction scheme, error-correcting code information corresponding to the determined information;
   identifying, by one or more computer processors, a second portion of the identified feature utilized for storing the error-correcting code information corresponding to the determined information; and
   encoding, by one or more computer processors, the error-correcting code information corresponding to the determined information within the second portion of the identified feature.

8. A computer program product for encoding information within a feature of a document, the computer program product comprising:
   one or more computer readable storage media and program instructions stored on the one or more computer readable storage media, the program instructions readable/executable by one or more computer processors:
   program instructions to determine information to encode within a document;
   program instructions to identify a feature within the document to encode information within based, at least in part, on metadata of the document corresponding to the feature;
   program instructions to determine a set of geometric properties of one or more segments of the identified feature;
   program instructions to encode a first bit of information of the determined information within a first segment of the feature within the document by modifying one or more geometric properties respectively associated with the first segment; and
   program instructions to output the document with information encoded within the first segment.

9. The computer program product of claim 8, wherein the identified feature is a periodically-varying feature based on a combination of two or more segments of alternating contrasts that repeat based on an interval of occurrences associated with a definition of the periodically-varying feature.

10. The computer program product of claim 8, wherein program instructions to determine information to encode within the document further comprise:
program instruction to determine a set of security rules associated with the document;
program instruction to determine a first information to encode within the document based on a first security rule of the determined set of security rules; and
program instruction to identify a first portion of the identified feature to encode the first information.

11. The computer program product of claim 9, wherein the combination of two or more segments of alternating contrast includes a segment that is a reference segment that does not encode information and includes at least one geometric property unaffected by encoding information within other segments of the combination of two or more segments.

12. The computer program product of claim 8, wherein modifying the one or more geometric properties respectively associated with the first segment is based on a value related to encoding information and a sign of the value that corresponds to a binary value corresponding to a bit of information to encode.

13. The computer program product of claim 8, further comprising:
program instruction to store a copy the determined information to encode within the document to a network-accessible database, wherein the determined information is respectively associated with an instance of the document; and
program instruction to convert the determined information to encode within the document to binary format.

14. The computer program product of claim 10, further comprising:
program instruction to identify a second security rule that dictates utilizing an error-correction scheme in conjunction with encoding the determined information;
program instruction to determine, based on the error-correction scheme, error-correcting code information corresponding to the determined information;
program instruction to identify a second portion of the identified feature utilized for storing the error-correcting code information corresponding to the determined information; and
program instruction to encode the error-correcting code information corresponding to the determined information within the second portion of the identified feature.

15. A computer system for encoding information within a feature of a document, the computer system comprising:
one or more computer processors;
one or more computer readable storage media; and
program instructions stored on the computer readable storage media for execution by at least one of the one or more computer processors, the program instructions comprising:
program instructions to determine information to encode within a document;
program instructions to identify a feature within the document to encode information within based, at least in part, on metadata of the document corresponding to the feature;
program instructions to determine a set of geometric properties of one or more segments of the identified feature;
program instructions to encode a first bit of information of the determined information within a first segment of the feature within the document by modifying one or more geometric properties respectively associated with the first segment; and
program instructions to output the document with information encoded within the first segment.

16. The computer system of claim 15, wherein the identified feature is a periodically-varying feature based on a combination of two or more segments of alternating contrasts that repeat based on an interval of occurrences associated with a definition of the periodically-varying feature.

17. The computer system of claim 15, wherein program instructions to determine information to encode within the document further comprise:
program instruction to determine a set of security rules associated with the document;
program instruction to determine a first information to encode within the document based on a first security rule of the determined set of security rules; and
program instruction to identify a first portion of the identified feature to encode the first information.

18. The computer system of claim 16, wherein the combination of two or more segments of alternating contrast includes a segment that is a reference segment that does not encode information and includes at least one geometric property unaffected by encoding information within other segments of the combination of two or more segments.

19. The computer system of claim 15, wherein modifying the one or more geometric properties respectively associated with the first segment is based on a value related to encoding information and a sign of the value that corresponds to a binary value corresponding to a bit of information to encode.

20. The computer system of claim 15, further comprising:
program instruction to store a copy the determined information to encode within the document to a network-accessible database, wherein the determined information is respectively associated with an instance of the document; and
program instruction to convert the determined information to encode within the document to binary format.

* * * * *